Jan. 4, 1955 E. C. HEARD 2,698,719
PEPPER MILL
Filed Nov. 27, 1950

INVENTOR
EDWARD C. HEARD
BY
ATTORNEY

United States Patent Office 2,698,719
Patented Jan. 4, 1955

2,698,719

PEPPER MILL

Edward C. Heard, Beverly Hills, Calif.

Application November 27, 1950, Serial No. 197,685

2 Claims. (Cl. 241—169)

This invention relates to a hand pepper mill and in particular to one adaptable for use at the table. One object of the invention is to provide a hand pepper mill for grinding pepper berries immediately before use. Another object is to provide a manually operated pepper mill adapted for use at the table. Another object is to provide a hand mill for grinding pepper berries and for distributing the pepper upon food as required. These and other objects are attained by my invention which will be understood from the following description, reference being made to the accompanying drawing in which.

Figure 1:
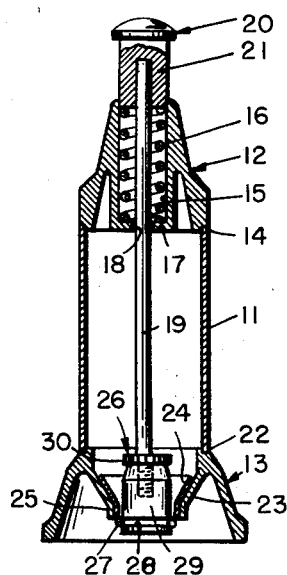
Figure 1 is a side elevational view partly in section of a preferred form of my pepper mill.
Figure 3:
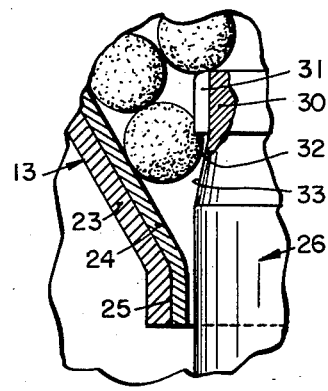
Figure 3 is an enlarged fragmentary elevational view partly in section, showing the conical feeder and cutter arrangement.
Figure 4:
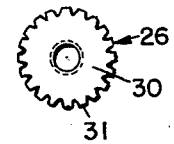
Figure 4 is a plan view of the cutter.
Figure 2:
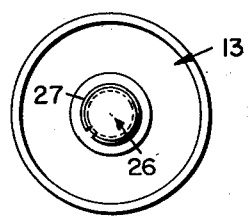
Figure 2 is a bottom view of the same.

Referring to the drawings which show a preferred form of my pepper mill, the container or barrel 11 for holding the pepper berries is provided with a top closure 12 and a bottom closure 13. The top closure, barrel, and bottom closure are preferably made from synthetic plastic material. The top closure is generally conical in shape, having a groove 14 at the base thereof adapted to receive the upper edge of the container or barrel 11. An axial recess 15 is provided in the top closure 12 adapted to hold a coil spring 16, the recess having an apertured bottom 17, the aperture 18 therein being arranged to receive the shaft 19 which is of steel or other metal. The shaft 19 is provided with a cap 20, having a shank 21 which fits into the axial recess 15. The coil spring 16 abuts the apertured bottom 17 and the lower face of the shank 21 of the cap 20. The bottom closure 13 is generally shaped externally as a truncated cone constituting the base for the device, the upper plane being provided with a peripheral groove 22 which is adapted to receive the lower edge of the container or barrel 11. An internal inverted cone 23 is provided in the bottom closure member 13 tapering downwardly from the upper plane thereof. The internal cone 23 is provided with a metal liner 24 which is frictionally held in place at the throat 25. A cutter member 26 is removably attached to the lower end of the shaft 19 and is adapted to reciprocate in the throat 25, the upwards movement being limited by the snap ring 27 which is provided outside the throat in the snap ring groove 28 of the cylindrical body 29. The cutter 30 has an external diameter substantially the same as the cylindrical body 29 and is provided with cutter teeth 31 having sharpened edges 32 adjacent the conical undercut 33, which is provided in the cylindrical body 29.

My pepper mill cuts or shaves off the pepper berries while held between the conical metal liner 24 and the cutter teeth 31. The shaft 19 and the attached cutter member 26 is reciprocated by pressing the thumb or a finger upon the cap 20 while holding the pepper mill in the hand. The cutter teeth edges 32 cut off particles of the pepper berries as the cutter 30 is moved downwardly with the shaft, and the berries are rolled over as the shaft 19 makes the reverse movement upwardly under the action of the spring 16, the pieces of pepper falling out when the snap ring 27 is lowered to provide an opening at the throat 25. Only as much pepper is cut from the berries as is immediately required, and upon releasing the shaft 19, the snap ring 27 seals the bottom opening. The pepper berries are introduced into the container or barrel 11 by raising the top closure 12 against the coil spring 16 which leaves an opening between the upper edge of the barrel and the top closure 12.

The advantages of my pepper mill will be apparent from the above description. Only the amount of pepper is pulverized which is required immediately and the remainder of the pepper berries are tightly enclosed when the device is not in use.

The milling operation is easily performed by the pressure of the finger on the cap because the cutter teeth merely slice off small shavings or particles of the pepper berries without the necessity of crushing them. The vertical reciprocating motion required to operate the pepper mill is easily performed with one finger while holding the device in the hand.

I claim:

1. A hand pepper mill comprising a hollow container for unground pepper berries, said container having upper closure and lower closure members, said upper closure member being provided with an axial hole for a reciprocatable shaft, said lower closure member having an inverted conical throat leading to an axial opening adapted to guide a cutter member in reciprocating movement; a reciprocatable shaft extending through said upper closure member and being attached at its opposite end to a cutter member; a cutter member adapted to be reciprocated by the reciprocating movement of said shaft, said cutter member having an intermediate undercut groove and peripheral right angled edge sharp teeth closely spaced apart around said shaft and projecting outwardly above said undercut relief groove; means adapted to limit the upward movement of said cutter member; and spring means associated with said shaft and adapted to normally hold said shaft and said cutter member at the upper limit of the reciprocable movement thereof.

2. A hand pepper mill comprising a hollow container for unground pepper berries, said container having upper closure and lower closure members, said upper closure member being provided with an axial hole for a reciprocatable shaft, said lower closure member having an inverted conical throat leading to an axial opening adapted to guide a cylindrical cutter member in reciprocating movement; a reciprocatable shaft extending through said upper closure member and being attached at its opposite end to a cutter member; a cutter member adapted to be reciprocated by the reciprocating movement of said shaft, said cutter member having an intermediate undercut groove and peripheral right angled edge sharp teeth closely spaced apart around said shaft bordering said undercut groove, means on said cutter member adapted to limit the upward movement of said cutter member; spring means associated with said shaft and adapted to normally hold said shaft and said cutter member at the upper limit of the reciprocable movement thereof, said spring means holding said upper closure in laterally shiftable position on said container, whereby an opening may be provided at times between said upper closure and said container for charging pepper berries into said chamber.

References Cited in the file of this patent

UNITED STATES PATENTS

| Number | Name | Date |
|---|---|---|
| 595,481 | Jenatschke et al. | Dec. 14, 1897 |
| 1,366,929 | Pasnik | Feb. 1, 1921 |
| 1,439,259 | Pasnik | Dec. 19, 1922 |
| 1,742,320 | Reiner | Jan. 7, 1930 |
| 1,773,720 | Alland | Aug. 26, 1930 |

FOREIGN PATENTS

| Number | Country | Date |
|---|---|---|
| 754,792 | France | Nov. 14, 1933 |
| 804,555 | France | Aug. 3, 1936 |